US009303775B2

(12) United States Patent
Jencks et al.

(10) Patent No.: US 9,303,775 B2
(45) Date of Patent: Apr. 5, 2016

(54) ROTARY SHEAR VALVE AND ASSOCIATED METHODS

(71) Applicant: Waters Technologies Corporation, Milford, MA (US)

(72) Inventors: Robert A. Jencks, Mendon, MA (US); Mark W. Moeller, Kingston, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 39 days.

(21) Appl. No.: 14/108,827

(22) Filed: Dec. 17, 2013

(65) Prior Publication Data

US 2014/0174541 A1 Jun. 26, 2014

Related U.S. Application Data

(60) Provisional application No. 61/740,836, filed on Dec. 21, 2012.

(51) Int. Cl.
*F16K 11/02* (2006.01)
*F16K 3/04* (2006.01)
*F16K 11/074* (2006.01)
*F16K 25/00* (2006.01)

(52) U.S. Cl.
CPC . *F16K 11/02* (2013.01); *F16K 3/04* (2013.01); *F16K 11/0743* (2013.01); *F16K 25/005* (2013.01); *Y10T 137/0318* (2015.04); *Y10T 137/86863* (2015.04)

(58) Field of Classification Search
CPC ........................................................ F16K 11/02
USPC ..................................... 137/625.46; 251/192
See application file for complete search history.

(56) References Cited

U.S. PATENT DOCUMENTS

| 3,040,777 | A | * | 6/1962 | Carson ................ F16K 11/0743 |
| | | | | 137/625.15 |
| 3,422,848 | A | | 1/1969 | Liebman et al. |
| 3,952,925 | A | * | 4/1976 | Babunovic et al. ........... 222/485 |
| 4,285,365 | A | * | 8/1981 | Coats et al. ............... 137/625.15 |
| 4,574,840 | A | * | 3/1986 | Schumann .......... F16K 11/0856 |
| | | | | 137/625.15 |
| 4,625,763 | A | * | 12/1986 | Schick ................ F16K 11/0743 |
| | | | | 137/625.11 |
| 5,194,226 | A | * | 3/1993 | Tomoff .................... B01L 3/565 |
| | | | | 422/509 |
| 5,465,748 | A | * | 11/1995 | Bowers .............. B01D 53/0446 |
| | | | | 137/240 |
| 5,842,680 | A | * | 12/1998 | Bustamante et al. ........... 251/65 |
| 6,311,719 | B1 | | 11/2001 | Hill et al. |
| 6,431,202 | B1 | | 8/2002 | Ahlgren et al. |
| 6,748,975 | B2 | * | 6/2004 | Hartshorne ............... F15C 5/00 |
| | | | | 137/625.46 |
| 6,889,710 | B2 | | 5/2005 | Wagner |
| 7,819,948 | B2 | | 10/2010 | Wagner |
| 8,622,086 | B2 | * | 1/2014 | Servin ...................... 137/625.46 |
| 8,627,851 | B2 | * | 1/2014 | Tower et al. ............. 137/625.46 |
| 8,905,075 | B2 | * | 12/2014 | Tower ...................... 137/625.15 |
| 8,960,231 | B2 | * | 2/2015 | Picha et al. .............. 137/625.46 |
| 2003/0196700 | A1 | * | 10/2003 | Gilbert ...................... F16K 3/08 |
| | | | | 137/375 |
| 2008/0087332 | A1 | * | 4/2008 | Noble et al. .................. 137/538 |
| 2011/0006237 | A1 | | 1/2011 | Tower |
| 2012/0119127 | A1 | * | 5/2012 | Tower ........................... 251/304 |

* cited by examiner

*Primary Examiner* — John K Fristoe, Jr.
*Assistant Examiner* — Christopher Ballman
(74) *Attorney, Agent, or Firm* — McCarter & English, LLP; Deborah M. Vernon

(57) ABSTRACT

Exemplary embodiments are directed to rotary shear valves which include a stator, a rotor defining a cavity extending at least partially therethrough, and a bladder. The rotor is rotatably mounted relative to the stator to create at least one fluidic path therebetween. The bladder comprises a polymer disposed inside the cavity. Exemplary embodiments are also directed to methods of operating a rotary shear valve.

28 Claims, 3 Drawing Sheets

ROTARY SHEAR VALVE AND ASSOCIATED METHODS

RELATED APPLICATION

This application claims priority to U.S. Provisional Application No. 61/740,836, filing date Dec. 21, 2012, which is incorporated herein by reference in its entirety.

TECHNICAL FIELD

The present disclosure relates to rotary shear valves and associated methods and, in particular, to rotary selector valves, which include an internal bladder and, in some embodiments, include a diaphragm.

BACKGROUND

Rotary valves are generally used in process industries for directing fluids from one or more sources to one or more destinations in a repeatable or cyclic process. For example, $CO_2$ based chromatography systems or UHPLC systems can generally utilize rotary shear valves which include a rotor and a stator as the two interacting sealing surfaces to alter the flow path directions of mobile phase constituents (e.g., solvents, modifiers, and the like) within the valve. Current high pressure chromatography shear valves typically employ a stator comprising a metallic element and a rotor device composed of a polymer material that forms a fluid-tight seal at a rotor/stator interface. While this combination has been found useful, it can be limited in pressure rating and/or valve lifetime.

Rotor materials can include high strength and solvent resistant polymers, such as polyether ether ketone (PEEK) or polyimide. However, both PEEK and polyimide have compressive strength limitations that can prevent the valve from safely operating above 20,000 psi. To increase the operating conditions of the valve beyond 20,000 psi, higher strength materials, such as stainless steels, have been considered. In particular, stainless steels have a significantly higher modulus than polymers, e.g., approximately 28 million psi versus approximately 2 million psi. However, the higher modulus can make it more difficult to achieve uniform contact stresses for the sealing surface between the rotor and stator. In particular, uniform contact stresses are important to allow for uniform wear and to seal the fluidic paths.

SUMMARY

In general, embodiments of the present disclosure are directed to rotary shear valves that create substantially uniform contact stresses between the rotor and stator, thereby promoting uniform wear and sealing of the fluidic paths. Specifically, the exemplary rotary shear valves utilize a three piece design including a diaphragm and bladder which allows for more uniform contact stresses between the rotor and stator and allows operation of the valve beyond 20,000 psi.

In accordance with embodiments of the present disclosure, exemplary rotary shear valves are provided that include a rotor, a stator and a bladder. The rotor defines a cavity extending at least partially therethrough and is rotatably mounted relative to the stator to create at least one fluidic path therebetween. The bladder comprises a polymer disposed inside the cavity.

The rotor generally includes at least one rotor groove and the stator includes at least one stator port for the at least one fluidic path. The polymer forming the bladder can be a low compressive yield strength polymer and generally exhibits fluid-like properties under a compressive stress. The bladder can be disposed inside the cavity such that, when compressed, the bladder substantially distributes contact stresses in at least two directions between the rotor and the stator. The exemplary rotary shear valves can include at least one diaphragm coupled to the rotor. The diaphragm can be, e.g., an integrated diaphragm, a separate diaphragm, and the like. The separate diaphragm can be coupled to the rotor using at least one of, e.g., electron beam welding, laser beam welding, friction welding, and the like. The integrated diaphragm is coupled to the rotor by being formed from a portion of the rotor. The exemplary rotary shear valves can include at least one relief slot for increased flexure of the integrated diaphragm.

The stator can define a flat stator face and at least one of the rotor and the at least one diaphragm can define a flat face complementary to the flat stator face. The diaphragm can be fabricated from at least one of, e.g., a stainless steel alloy, such as a UNS S21800 stainless steel, a cobalt alloy, a nickel alloy, a nickel-cobalt alloy, such as UNS R30035 nickel-cobal alloy (e.g., MP35N® available from SPS Technologies, Inc. of PA), and the like. The stator can be fabricated from at least one of e.g., a titanium alloy, a 316 stainless steel, an MP35N® alloy, and the like. The stator can include a coating, e.g., a diamond-like coating, and in some embodiments, a nanofilm diamond-like coating (e.g., having a thickness of 5,000 nm or less). The polymer can be at least one of, e.g., a polytetrafluoroethylene (PTFE), an ultra-high-molecular-weight polyethylene (UHMWPE), and the like.

The exemplary rotary shear valves can include a spacer disposed at least partially inside the cavity which transmits a load into the bladder. The spacer can be fabricated from, e.g., a 316 stainless steel, and the like. The bladder can transmit the load into at least one of the rotor and at least one diaphragm through uniform contact stresses. That is, in some embodiments the bladder transmits the load into the rotor. In certain embodiments, the bladder transmits the load in both the rotor and a first diaphragm. In other embodiments, the bladder transmits the load into the rotor, and two or more diaphragms. In some embodiments, the uniform contact stress reduces wear of at least one of the rotor, the stator, the bladder, and the at least one diaphragm. In certain embodiments, the uniform contact stress seals the at least one fluidic path. In embodiments, the uniform contact stress seals the at least one fluidic path as well as reduces wear of one or more of the rotor, stator, bladder, and at least one diaphragm.

In accordance with embodiments of the present disclosure, exemplary methods of operating a rotary shear valve are provided that include providing a valve body that includes a rotor, a stator and a bladder. The exemplary methods generally include providing a stator and providing a rotor defining a cavity extending at least partially therethrough rotatably mounted relative to the stator to create at least one fluidic path therebetween. The exemplary methods include positioning a bladder comprising a polymer inside the cavity of the rotor. The exemplary methods further include transmitting a compressive stress into the bladder. Transmitting the compressive stress into the bladder generally distributes contact stresses between the rotor and the stator.

In general, the exemplary methods include providing at least one diaphragm coupled to the rotor and providing a spacer disposed at least partially inside the cavity. The exemplary methods can include transmitting a compressive stress into the bladder via the spacer such that the bladder exhibits fluid-like properties and substantially distributes the compressive stress in at least two directions. The exemplary methods can include transmitting the compressive stress into at least one of the rotor and the at least one diaphragm via the bladder through uniform contact stresses.

The above exemplary embodiments in accordance with the present disclosure provide many advantages. For example, one or more embodiments described herein create substantially uniform contact stresses between the rotor and stator to promote uniform wear and/or sealing of the fluidic paths. As a result, the exemplary rotary shear valves can be implemented in a variety of operating conditions, including those beyond about 20,000 psi.

Other advantages and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed rotary shear valves and associated methods, reference is made to the accompanying figures (which are not necessarily to scale), wherein.

DESCRIPTION OF EXEMPLARY EMBODIMENTS

Figure 1:
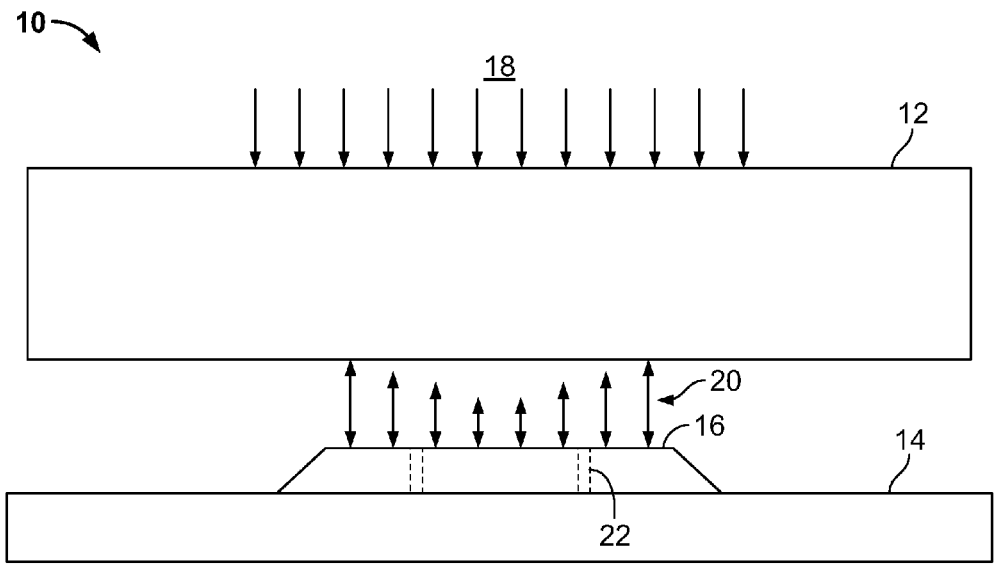
FIG. 1 shows a side view of a rotary shear valve of the prior art.

With reference to FIG. 1, a traditional rotary shear valve 10 is illustrated with a one-piece rotor 12 and a stator 14 having a sealing surface 16. A preload 18 of, e.g., approximately 650 lbs, can generally be applied to the rotor 12 to maintain contact between the rotor 12 and the stator 14 at the sealing surface 16. However, due to the one-piece rotor 12 in contact with the flat sealing surface 16 of the stator 14, the traditional rotary shear valve 10 can exhibit non-uniform contact stresses 20 at the sealing surface 16. In particular, the contact stresses 20 can generally be lowest at the center and gradually increase from the center in the direction of the edges of the stator 14 sealing surface 16. As discussed above, the non-uniform contact stresses 20 at the sealing surface 16 between the rotor 12 and the stator 14 can cause non-uniform wear of the rotor 12 and/or the stator 14 and can fail to properly seal the fluidic paths 22 between the rotor 12 and stator 14.

The relationship between stress and strain can be determined by utilizing Hooke's Law as shown by Equation 1 below:

$$\sigma = E \times \epsilon \quad (1)$$

where $\sigma$ represents stress, E represents Young's Modulus and $\epsilon$ represents strain. As an example, a traditional rotor 12 may have a thickness of approximately 0.140 inches, a modulus of approximately 28 million psi for a stainless steel, a rotor thickness variation of approximately 0.000050 inches, and a stress of approximately 10,000 psi. To fluidically seal at approximately 25,000 psi, the contact stresses 20 must exceed the fluid pressure and be near approximately 28,000 psi. Having a potentially 10,000 psi variation in contact stresses 20 can lead to uneven and excessive wear of the rotor 12.

Figure 2:
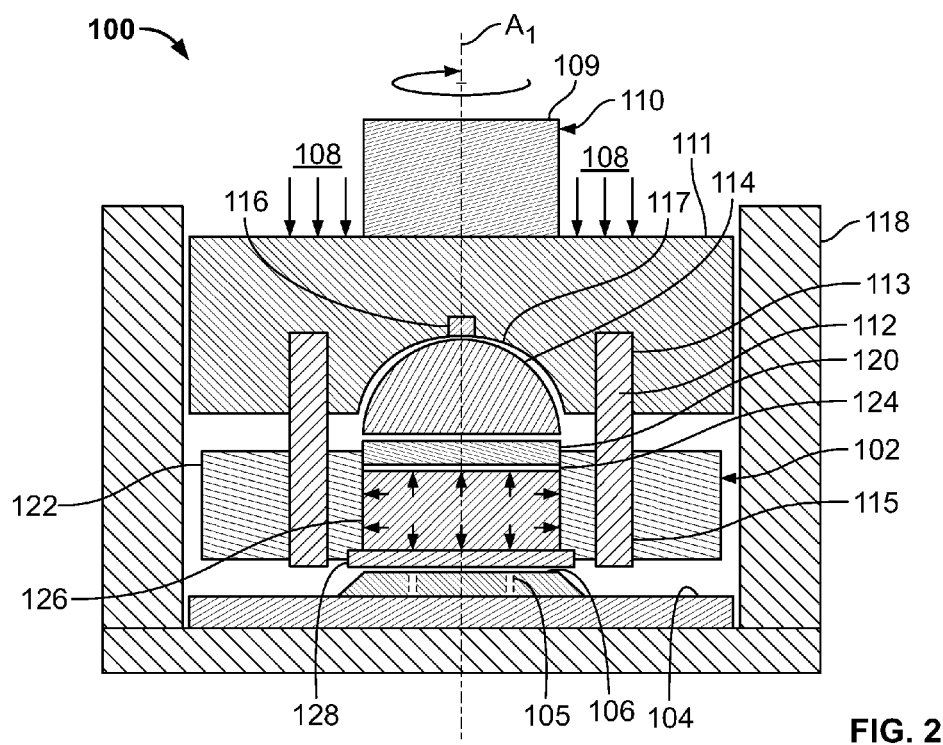
FIG. 2 shows a cross-sectional view of an exemplary rotary shear valve.

Turning now to FIG. 2, a cross-sectional view of an exemplary (i.e., in accordance with an embodiment of the present technology) rotary shear valve 100, e.g., a rotary selector valve such as a rotary injector valve with three rotor grooves, a rotary vent valve with two rotor grooves, and a rotary column selection valve with one radial groove, is provided which includes a three-piece rotor 102 and a stator 104. The rotor 102 and the stator 104 can be aligned along a central vertical axis $A_1$. The rotor 102 and the stator 104 can further rotate relative to each other about the central vertical axis $A_1$. The rotor 102 generally defines a rotor groove (not shown) and the stator 104 generally defines at least one stator port 105 for creation of fluidic paths between the rotor 102 and stator 104. In some embodiments, the stator 104 can be fabricated from, e.g., a titanium alloy, a 316 stainless steel, an MP35N alloy, and the like. In some embodiments, the stator 104 can include a coating, e.g., a nanofilm diamond-like coating (DLC), and the like. The material of fabrication for the stator 104, e.g., a titanium alloy with a modulus of approximately 14,000,000 psi, and the like, can exhibit a lower modulus and be more compliant or compatible with the material of fabrication for the rotor 102 to improve the sealing capability against the rotor 102. The coating on the stator 104 generally reduces the amount of friction between the stator 104 and other components of the rotary shear valve 100. In some embodiments, the stator 104 can be fabricated from a material containing iron content and the DLC coating can act to prevent the iron content from rusting after being exposed due to wear.

The rotary shear valve 100 includes a ram shaft 110 including a shaft 109 and a shaft/rotor interface 111. The shaft 109 can extend from the shaft/rotor interface 111 along the central vertical axis $A_1$ and engage with a mechanism configured to rotatably drive the shaft 109 about the central vertical axis $A_1$. The shaft/rotor interface 111 can include two or more apertures 113 configured and dimensioned to receive pins 112 for engaging complementary apertures 115 in the rotor 102. When inserted in the respective apertures, the pins 112 can detachably interlock the ram shaft 110 with the rotor 102. Thus, as the ram shaft 110 axially rotates about the central vertical axis $A_1$, the pins 112 engage the apertures 115 in the rotor 102 to simultaneously axially rotate the rotor 102 relative to the stator 104.

In some embodiments, the ram shaft 110 can include a cavity 117, e.g., a groove, centrally positioned on the face of the shaft/rotor interface 111 adjacent to the rotor 102. The cavity 117 can be configured to receive a ball bearing 114 for supporting the rotor 102. The ball bearing 114 can define a substantially circular top face for mating relative to the complementary cavity 117 surface and a substantially planar bottom face for mating relative to the rotor 102 or components of the rotor 102. In some embodiments, the cavity 117 can further include a grease well 116 configured and dimensioned to receive a lubricant for lubricating the contact area in the cavity 117 between the ball bearing 114 and the shaft/rotor interface 111 of the ram shaft 110. In some embodiments, a spacer 120 can be positioned between the substantially planar bottom face of the ball bearing 114 and the components of the rotor 102. The spacer 120 can be fabricated from, e.g., a 316 stainless steel, and the like. In some exemplary embodiments, the spacer 120 can be fabricated from alternative heat-treated stainless steel materials in order to strengthen the spacer 120 for transfer of forces against a bladder 126. The rotary shear valve 100 assembly can be surrounded by a bushing 118.

The exemplary three-piece rotor 102 generally includes a rotor body 122 which defines a cavity 124 axially centered along the central vertical axis $A_1$. The cavity 124 can extend at least partially through the rotor body 122. In some embodiments, the cavity 124 can be configured as substantially cylindrical. However, it should be understood that in some embodiments, the cavity 124 can be configured in a variety of shapes. In the exemplary embodiment illustrated in FIG. 2, the rotor body 122 defines cavity 124 extending through the entire rotor 102, e.g., extending from a top surface to the bottom surface of the rotor body 122 along the central vertical axis $A_1$.

In some embodiments, the rotor 102 can be fabricated from a non-stainless steel material to reduce or prevent rust formation and can have a thickness of, e.g., approximately 0.140 inches. Steel alloys generally include a significant percentage of iron. As the rotor 102 begins to wear due to interaction with the stator 104, the passive chromium oxide layer of stainless steel materials which provides corrosion resistance can be penetrated. Once penetrated, the iron underneath the layer, if exposed to air and/or water, can begin to rust. Rust can thereby enter the chromatographic mobile phase (e.g., $CO_2$ flowstream), a contamination which cannot be tolerated. Thus, in some embodiments, the rotor 102 can be fabricated from a non-stainless steel material, e.g., a cobalt alloy, a nickel alloy, and the like, with no iron content to reduce or prevent rust formation.

The cavity 124 of the rotor body 122 can be configured and dimensioned to receive a bladder 126 therein. For example, FIG. 2 illustrates the rotor 102 including the bladder 126 positioned within the cavity 124 such that the bladder 126 does not extend outside of the cavity 124. The bladder 126 can be fabricated from a low compressive yield strength polymer, e.g., a polytetrafluoroethylene (PTFE), an ultra-high-molecular-weight polyethylene (UHMWPE), and the like. As will be discussed in greater detail below, upon transmission of a compression stress against the bladder 126 with the bearing 114 and/or the spacer 120, the bladder 126 can exhibit substantially fluid-like properties.

In the exemplary embodiment of FIG. 2, the rotor 102 includes a diaphragm 128, e.g., a separate membrane, coupled to the bottom surface of the rotor body 122 by coupling means such as welding, e.g., electron beam welding, laser beam welding, friction welding and the like, with or without filler materials. The diaphragm 128 can be fabricated from a metal material, e.g., a stainless steel alloy, such as a UNS S21800 stainless steel, a cobalt alloy, a nickel alloy, and the like. The diaphragm 128 can act to hermetically seal the rotor 102 such that the fully-constrained compliant backing, e.g., the bladder 126, can be contained therein. Thus, when the diaphragm 128 has been secured to the rotor body 122, the rotor body 122 and the diaphragm 128 can essentially become integral parts. It should be understood that the coupling means for securing or coupling the diaphragm 128 to the rotor body 122 should be sufficiently strong to resist the torque created by the rotating ram shaft 110 between the stator 104 substrate and the rotor 102.

A preload 108, e.g., a compressive stress, axially applied to a shaft/rotor interface 111 of the ram shaft 110 in a direction parallel to the central vertical axis $A_1$ can transfer through the ball bearing 114 (into the optional spacer 120) and further into the bladder 126. Upon transmission of the preload 108 against the bladder 126, the bladder 126 can exhibit substantially fluid-like properties within the cavity 124. The bladder 126 can thereby evenly transfer the compressive forces from the preload 108 against the inner walls of the cavity 124, the spacer 120 and the diaphragm 128. Further, the compressive forces of the preload 108 can be evenly distributed by the diaphragm 128 against the sealing surface 106 of the stator 104. The alignment of the ram shaft 110, the ball bearing 114, the spacer 120 and the diaphragm 128 along the central vertical axis $A_1$ ensures a self-aligned loading and transfer of the preload 108.

In some embodiments, the diaphragm 128 can measure approximately 0.024 inches in thickness. In some exemplary embodiments, the diaphragm 128 thickness can be thinner or thicker than 0.024 inches. In general, the diaphragm 128 is sized to adequately absorb and uniformly transfer the compressive forces created by the bladder 126 against the sealing surface 106 of the stator 102. In particular, during operating conditions of the rotary shear valve 100, the pressure applied against the bladder 126 can cause the bladder 126 to yield and exhibit substantially fluid-like properties such that the bladder 126 substantially evenly distributes the forces against the inner walls of the cavity 124, the spacer 120 and the diaphragm 128. As would be understood by those of ordinary skill in the art, since the bladder 126 is fully constrained within the cavity 124 of the rotor 102 at all surfaces, (e.g., by the spacer 120, the walls of the cavity 124 and the diaphragm 128) substantially all of the stresses created by the preload 108 can be sustained. Substantially uniform stresses are therefore applied to the thin diaphragm 128 and further transferred against the sealing surface 106 of the stator 104.

The uniform stresses distributed by the bladder 126 against the diaphragm 128 ensure that, rather than increasing from the center to the edges of the sealing surface 106, the contact stresses are uniformly distributed along the sealing surface 106. In some embodiments, the uniform contact stresses promote even wear of the rotor 102 and/or the stator 104. In some embodiments, the uniform contact stresses create the desired sealing pressure of the fluidic paths at the sealing surface 106. In some embodiments, the sealing surface 106, e.g., the sealing interface, can be substantially flat or planar rather than having a complex form in order to uniformly mate with the rotor 102 and/or the diaphragm 128 and to simplify the manufacturing process of the stator 104. In some exemplary embodiments, the sealing surface 106 diameter can be approximately 0.170 inches and can withstand, e.g., approximately 25,000 psi, 28,000 psi, and the like, in contact stresses.

Figure 3:
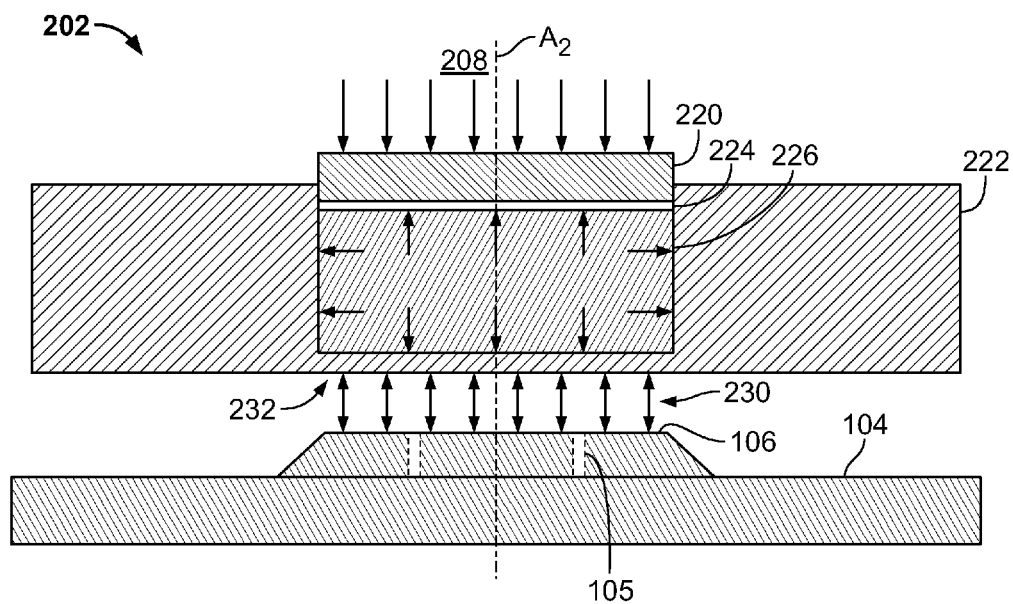
FIG. 3 shows a cross-sectional view of an exemplary rotary shear valve with an integrated diaphragm.

FIG. 3 illustrates an exemplary assembly of a stator 104 of FIG. 2 with an exemplary embodiment of a rotor 202. The rotor 202 and the stator 104 can be aligned along the central vertical axis $A_2$. The rotor 202 can include a rotor body 222 which defines a cavity 224 passing only partially therethrough, e.g., passing from the top surface of the rotor body 222 and extending only partially through the rotor body 222 in the direction of the bottom surface of the rotor body 222 along the central vertical axis $A_2$. It should be understood that in some embodiments, the cavity 224 can pass from the bottom surface of the rotor body 222 and extend only partially through the rotor body 222 in the direction of the top surface of the rotor body 222 along the central vertical axis $A_2$. In particular, the cavity 224 can extend partially through the rotor body 222 such that an integrated diaphragm 232 is formed at either the top and/or bottom surface of the rotor body 222. The integrated diaphragm 232 can be configured to function substantially similarly to the separate diaphragm 128 discussed with respect to the embodiment of FIG. 2. Thus, rather than coupling the diaphragm 128 to the rotor 102 such that the diaphragm 128 is substantially integral with the rotor 102, the integrated diaphragm 232 can be formed from the rotor body 222 by creating a cavity 224 partially therethrough.

Similar to the rotor 102 of FIG. 2, in some embodiments, the rotor 202 can include a spacer 220 which transfers a preload 208 against the bladder 226 which is disposed in the cavity 224 and positioned against the integrated diaphragm 232. The fluid-like property of the bladder 226 upon application of the compressive preload 208 forces from the spacer 220 allows the bladder 226 to evenly distribute the preload 208 force against the inner surfaces of the cavity 224, the spacer 220 and the integrated diaphragm 232. The diaphragm 232, in turn, evenly transfers the compressive forces against the sealing surface 106 of the stator 104. Substantially uniform contact stresses 230 are thereby created between the diaphragm 232 and the sealing surface 106 of the stator 104. In particular, the integrated diaphragm 232 can be dimensioned such that the bladder 226 can evenly transmit the preload 208 forces through the integrated diaphragm 232 and against the sealing surface 106. For example, the integrated diaphragm 232 can have a thickness of approximately 0.024 inches. However, it should be understood that the thickness of the integrated diaphragm 232 can be dimensioned greater or less than 0.024 inches in other embodiments such that the integrated diaphragm 232 is capable of evenly transferring the compressive forces imparted upon the diaphragm 232 by the bladder 226.

Figure 4:
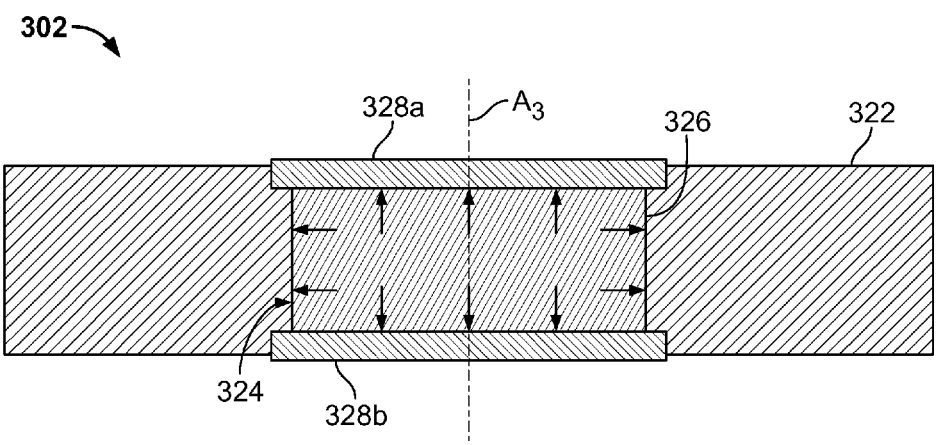
FIG. 4 shows a cross-sectional view of an exemplary rotary shear valve with two separate diaphragms.

With reference to FIG. 4, an exemplary rotor 302 having a cavity 324 extending through the entire rotor body 322 is provided. In particular, the cavity 324 can centrally extend from the top surface to the bottom surface of the rotor body 322 along the central vertical axis $A_3$. The rotor 302 includes two separate diaphragms 328a and 328b coupled to the rotor body 322 at the cavity 324 openings such that the two diaphragms 328a and 328b are essentially integral with the rotor body 322. In some embodiments, the rotor body 322 can include a circumferential step or groove surrounding the cavity 324 openings configured and dimensioned to receive one of the two diaphragms 328a and 328b. The bladder 326 can be disposed and sealed within the cavity 324 between the two diaphragms 328a and 328b by coupling the diaphragms 328a and 328b to the top and bottom surfaces of the rotor body 322. Although illustrated as being offset from the planar surface of the rotor body 322, in some embodiments, one or both of the diaphragms 328a and 328b can be substantially aligned and planar with the surface of the rotor body 322.

In some embodiments, the top diaphragm 328a can be positioned against the planar bottom surface of the ball bearing 114 and/or a spacer 120 of FIG. 2 such that a preload, e.g., a compressive force, can be transferred into the bladder 326 and the bottom diaphragm 328b. In particular, the top diaphragm 328a can receive the preload and transfer the preload to the bladder 326 contained within the cavity 324. As discussed previously, the fluid-like property of the bladder 326 during operating conditions, e.g., application of a compressive stress against the bladder 326, results in substantially uniform forces being transmitted to the inner walls of the cavity 324 and the two diaphragms 328a and 328b. Substantially uniform contact stresses are thereby created by the bottom diaphragm 328b against the sealing surface of the stator 104.

Figure 5:
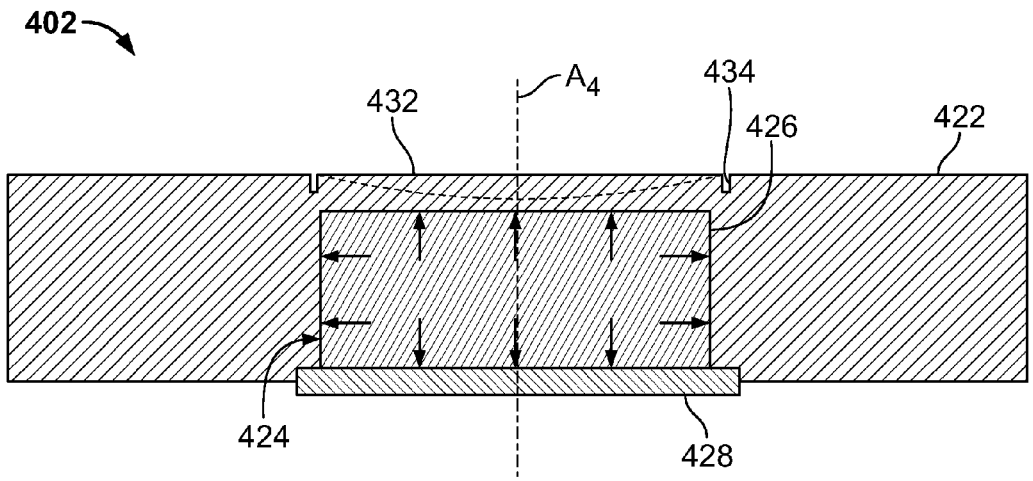
FIG. 5 shows a cross-sectional view of an exemplary rotary shear valve with an integrated diaphragm and a separate diaphragm.

With reference to FIG. 5, an exemplary rotor 402 having a cavity 424 extending partially through the rotor body 422 is provided. In particular, the cavity 424 can centrally and partially extend from the bottom surface of the rotor body 422 in the direction of the top surface of the rotor body 422 along the central vertical axis $A_4$. In particular, the partially extending cavity 424 can form an integrated diaphragm 432 in top surface of the rotor body 422. The cavity 424 opening at the bottom surface of the rotor body 422 can include a circumferential step or groove configured and dimensioned to receive a separate diaphragm 428 for coupling to the rotor body 422. A bladder 426 can be positioned and sealed within the cavity 424 between the integrated diaphragm 432 and the separate diaphragm 428. Although illustrated as being offset from the planar surface of the rotor body 422, in some embodiments, the separate diaphragm 428 can be substantially aligned and planar with the surface of the rotor body 422.

In some exemplary embodiments, the integrated diaphragm 432 can include a relief slot 434 or groove circumferentially surrounding the integrated diaphragm 432 about the central vertical axis $A_4$ to allow for increased flexure of the integrated diaphragm 432 (as indicated by the dashed lines), thereby permitting additional and/or improved transmission of preload forces to the bladder 426. For example, the relief slot 434 can increase the flexibility of the integrated diaphragm 432 such that the integrated diaphragm 432 can bend in the direction of the bladder 426 to more effectively transfer preload forces applied to the rotor 402.

Figure 6:
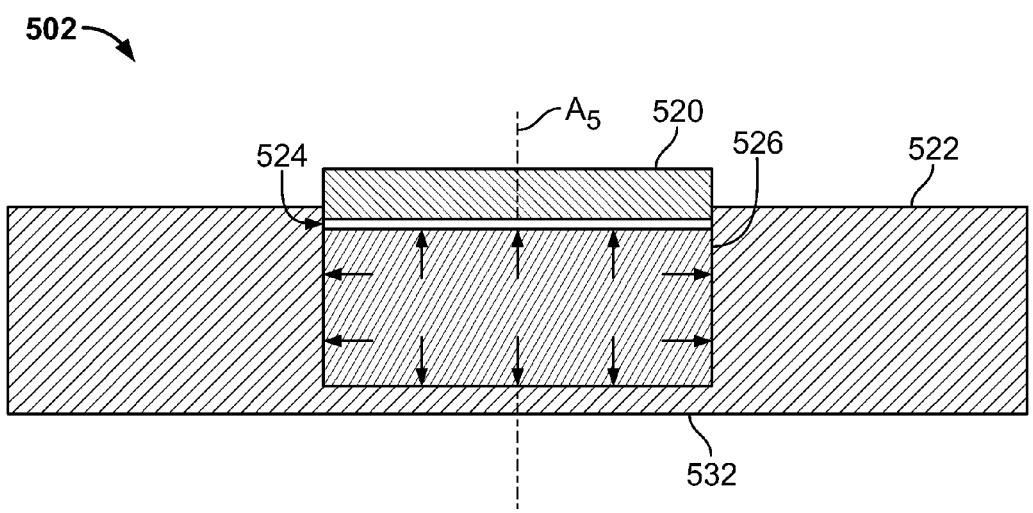
FIG. 6 shows a cross-sectional view of an exemplary rotary shear valve with an integrated diaphragm.

FIG. 6 illustrates an exemplary rotor 502 having a cavity 524 extending partially through the rotor body 522. In particular, the cavity 524 can centrally and partially extend from the top surface of the rotor body 522 in the direction of the bottom surface of the rotor body 522 along the central vertical axis $A_5$. In particular, the partially extending cavity 524 can form an integrated diaphragm 532 along the bottom surface of the rotor body 522. A bladder 526 can be disposed within the cavity 524 and positioned against the integrated diaphragm 532. A spacer 520 can be positioned at least partially within the cavity 524 and against the bladder 526 to transfer a preload to the bladder 526, the integrated diaphragm 532 and the sealing surface of the stator. Translation of the spacer 520 along the central vertical axis $A_5$ can be aligned by partially translating the spacer 520 within the cavity 524 as a preload is applied to maintain a substantially even distribution of preload forces against the bladder 526.

In operation, the valves discussed herein are configured to receive a compressive stress into a bladder positioned within a cavity such that the bladder distributes substantially uniform contact stresses between the rotor and the stator. The substantially uniform contact stresses created between the rotor and the stator promote uniform wear and sealing of the fluidic paths. The substantially uniform contact stresses between the rotor and the stator also allow operation of the valve beyond 20,000 psi.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:
1. A rotary shear valve, comprising:
   a stator;
   a rotor defining a cavity extending at least partially therethrough and rotatably mounted relative to the stator to create at least one fluidic path therebetween;
   a bladder comprising a polymer disposed inside the cavity in a spaced manner relative to the stator; and a diaphragm disposed between the stator and the bladder, the diaphragm separating the bladder from the stator.

2. The rotary shear valve of claim 1, wherein the rotor includes at least one rotor groove and the stator includes at least one stator port for the at least one fluidic path.

3. The rotary shear valve of claim 1, wherein the polymer exhibits fluid-like properties under a compressive stress.

4. The rotary shear valve of claim 3, wherein the polymer is a low compressive yield strength polymer.

5. The rotary shear valve of claim 3, wherein the bladder is disposed inside the cavity such that, when compressed, the bladder substantially distributes contact stresses in at least two directions between the rotor and the stator.

6. The rotary shear valve of claim 1, wherein the diaphragm is coupled to the rotor.

7. The rotary shear valve of claim 6, wherein the diaphragm is an integrated diaphragm.

8. The rotary shear valve of claim 7, comprising at least one relief slot for increased flexure of the integrated diaphragm.

9. The rotary shear valve of claim 6, wherein the diaphragm is a separate diaphragm.

10. The rotary shear valve of claim 9, wherein the separate diaphragm is coupled to the rotor using a welding technique selected from the group consisting of: electron beam welding, laser beam welding, friction welding, and combinations thereof.

11. The rotary shear valve of claim 6, wherein the stator defines a flat stator face.

12. The rotary shear valve of claim 11, wherein at least one of the rotor and the diaphragm defines a flat face complementary to the flat stator face.

13. The rotary shear valve of claim 6, wherein the diaphragm is fabricated from a material selected from the group consisting of: a stainless steel alloy, a cobalt alloy, a nickel alloy, and combinations thereof.

14. The rotary shear valve of claim 6, comprising a spacer disposed at least partially inside the cavity.

15. The rotary shear valve of claim 14, wherein the spacer transmits a load into the bladder.

16. The rotary shear valve of claim 15, wherein the bladder transmits the load into at least one of the diaphragm and the rotor through uniform contact stresses.

17. The rotary shear valve of claim 16, wherein the uniform contact stresses reduce wear of at least one of the rotor, the stator, the bladder, and the diaphragm.

18. The rotary shear valve of claim 16, wherein the uniform contact stresses seal the at least one fluidic path.

19. The rotary shear valve of claim 14, wherein the spacer is fabricated from a 316 stainless steel.

20. The rotary shear valve of claim 1, wherein the stator is fabricated from a material selected from the group consisting of: a titanium alloy, a 316 stainless steel, an MP35N alloy, and combinations thereof.

21. The rotary shear valve of claim 20, wherein the stator comprises a coating.

22. The rotary shear valve of claim 21, wherein the coating is a nanofilm diamond-like coating.

23. The rotary shear valve of claim 1, wherein the polymer is selected from the group consisting of: a polytetrafluoroethylene (PTFE), an ultra-high-molecular-weight polyethylene (UHMWPE), and combinations thereof.

24. A method of operating a rotary shear valve, comprising:
providing a stator,
providing a rotor defining a cavity extending at least partially therethrough and rotatably mounted relative to the stator to create at least one fluidic path therebetween,
positioning a bladder comprising a polymer inside the cavity of the rotor in a spaced manner relative to the stator,
positioning a diaphragm between the stator and the bladder, the diaphragm separating the bladder from the stator, and
transmitting a compressive stress into the bladder,
wherein transmitting the compressive stress into the bladder distributes contact stresses between the rotor and the stator.

25. The method of claim 24, comprising coupling the diaphragm to the rotor.

26. The method of claim 25, comprising transmitting the compressive stress into at least one of the diaphragm and the rotor via the bladder through uniform contact stresses.

27. The method of claim 24, comprising positioning a spacer at least partially inside the cavity.

28. The method of claim 27, comprising transmitting the compressive stress into the bladder via the spacer such that the bladder exhibits fluid-like properties and substantially distributes the compressive stress in at least two directions.

* * * * *